(12) United States Patent
Erlebach

(10) Patent No.: US 10,260,223 B2
(45) Date of Patent: Apr. 16, 2019

(54) WALL MOUNTED SHOWER DRAIN

(71) Applicant: QD HOLDINGS I LLC, Cleveland, OH (US)

(72) Inventor: Josef Erlebach, Silverthorne, CO (US)

(73) Assignee: QD Holdings I LLC, Cleveland, OH (US)

( * ) Notice: Subject to any disclaimer, the term of this patent is extended or adjusted under 35 U.S.C. 154(b) by 0 days.

(21) Appl. No.: 15/505,547

(22) PCT Filed: Aug. 16, 2016

(86) PCT No.: PCT/US2016/047153
§ 371 (c)(1),
(2) Date: Feb. 21, 2017

(87) PCT Pub. No.: WO2017/031107
PCT Pub. Date: Feb. 23, 2017

(65) Prior Publication Data
US 2017/0241124 A1    Aug. 24, 2017

Related U.S. Application Data

(60) Provisional application No. 62/207,218, filed on Aug. 19, 2015.

(51) Int. Cl.
*A47K 3/00* (2006.01)
*E03F 5/04* (2006.01)
*A47K 3/40* (2006.01)

(52) U.S. Cl.
CPC .......... *E03F 5/0408* (2013.01); *A47K 3/008* (2013.01); *A47K 3/40* (2013.01); *E03F 5/041* (2013.01)

(58) Field of Classification Search
CPC ....................................................... A47K 3/40
USPC ...................................................... 4/612–614
See application file for complete search history.

(56) References Cited

U.S. PATENT DOCUMENTS

| | | |
|---|---|---|
| 2010/0162481 A1 | 7/2010 | Erlebach |
| 2011/0047695 A1 | 3/2011 | Niedens |
| 2011/0162137 A1 | 7/2011 | Kik |
| 2013/0000034 A1 | 1/2013 | Wedi |
| 2016/0130794 A1 | 5/2016 | Erlebach |

FOREIGN PATENT DOCUMENTS

| | | |
|---|---|---|
| EP | 2236683 B1 | 5/2014 |
| WO | WO 2014-186021 | 11/2014 |

OTHER PUBLICATIONS

Quick Drain USA / Side Waste Outlet Tub to Shower Conversion, Sep. 4, 2014. Video from www.youtube.com/watch?v=M2aCEIkRr-4.

*Primary Examiner* — Lori Baker
(74) *Attorney, Agent, or Firm* — BakerHostetler

(57) ABSTRACT

A drain assembly that is installed at and against the wall of a shower stall providing an inlet along the intersection of the wall with the floor, and the methodology of installing the drain assembly are described. In at least some embodiments of an installed configuration, only a thin slit along the wall/floor intersection is visible in a finished shower enclosure.

31 Claims, 17 Drawing Sheets

WALL MOUNTED SHOWER DRAIN

RELATED APPLICATIONS

This application claims priority to and incorporates fully by reference in its entirety including all filed supporting appendices U.S. Provisional Patent Application No. 62/207,218 filed on Aug. 19, 2015, entitled Wall Mounted Shower Drain and having the same inventorship as the present application.

BACKGROUND

Bathrooms and showers stalls are often provided with tiled floors especially in higher end homes. In shower stalls, a drain is typically placed in or near the center of the stall and the floor is sloped slightly towards the center drain to ensure the water runs into the drain as opposed to sitting on the floor or seeping into the structure at the intersection of the floor with the stall walls.

As can be appreciated, tiling a floor that slopes in different directions towards the center of the stall can be difficult and time consuming especially if localized reversed slopes and other slope anomalies are to be avoided. The problem can be especially acute when large-sized tiles (6"×6", 8"×8", 12"×12" and larger) are utilized. Often it is necessary to cut the tiles on a diagonal where two slopes running in different directions intersect.

Center drains and the associated tiles sloping in multiple directions can be distracting and otherwise detract from the visual and aesthetic presentation of a high end shower stall.

Elongated drains that are located a one edge of a stall thereby facilitating a floor that slopes primarily in a single direction are known. However, these drains still require floor grates that are readily visible and can detract from the overall visual appeal of a stall particularly at the transition from floor to an adjoining wall.

DETAILED DESCRIPTION

Figure 1:
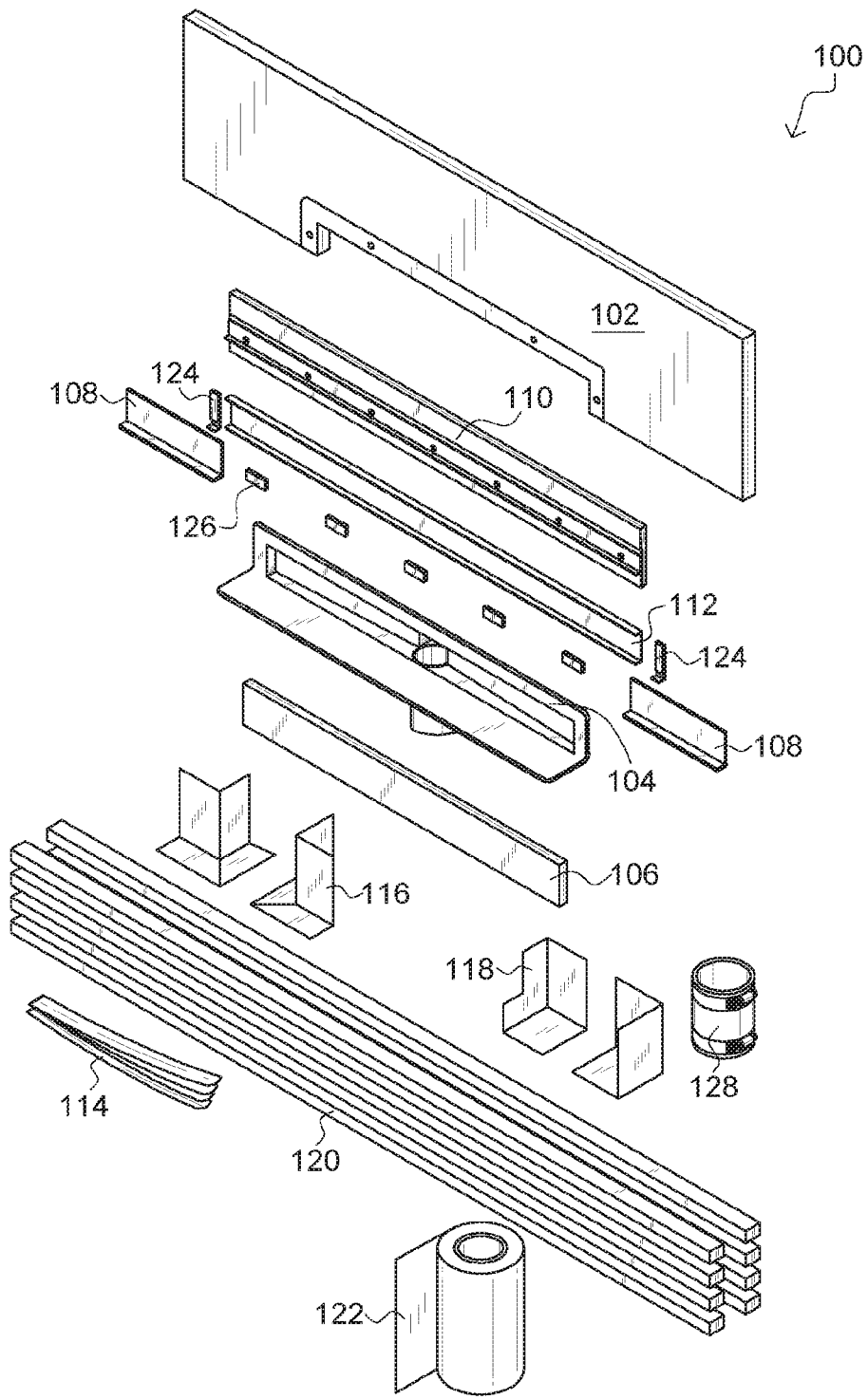
FIG. 1 is an exploded isometric view of the various components and subassemblies that a wall drain assembly according to one embodiment of the present invention.

Embodiments of the present invention comprise both a drain assembly that is installed at and against the wall of a shower stall providing an inlet along the intersection of the wall with the floor, and the methodology of installing the drain assembly. In at least some embodiments of an installed configuration, only a thin slit along the wall/floor intersection is visible in a finished shower enclosure. Additional embodiments also include variations of the drain system, the various components that comprise the system and a shower enclosure incorporating the system.

In some embodiments, the various components of the wall drain assembly are provided as a system in various standard lengths to span most if not the entire side of a wall in a shower stall. Some possible length variations include 48", 72" and 96". The shower drain body is typically significantly shorter than the assembly length (such as 26" in some variations) with drain extension pieces emanating from each of its right and left ends to create the total length. To fit the drain along spans less than the standard assembly length, the drain extension pieces and various other components of the system can be cut to the desired and necessary length. Multiple drain bodies can be used with the extensions for larger spans, such as a 114" long assembly. The drain bodies are placed next to each other and a connector piece is placed between them.

Embodiments include drain bodies having both horizontal and vertical waste outlets to accommodate the plumbing of a particular installation. The body can be made of any suitable materials including but not limited to stainless steel, reinforced and unreinforced plastics (including PVC), and aluminum. The body is characterized by a sloping configuration wherein the internal walls and sides of the body all slope towards the waste outlets to ensure that there is no standing water during use that could cause mineral and soap scum residue.

Embodiments of the wall drain assembly can be utilized in most custom fabricated showers using shower pan and waterproofing systems known in the art including the use of a formed in place dry pack mortar or concrete floor. Additionally, because the entire floor need only slope in a single direction instead of multiple directions as with a center drain stall, pre-sloped formed panels can be secured directly and quickly to the subfloor significantly and substantially reducing the time to fabricate a shower stall. Embodiments can be used with topical liquid waterproofing, sheet waterproofing or sub drainage systems including hot mop, copper pan and PVC pan liners.

Embodiments of the wall drain assembly are grate-less wherein water flow into the drain along the floor through a slit formed at the bottom of the stall wall in which the drain is installed. A positionable and removable cover is utilized that covers the front of the drain above the slit and is configured to receive tile or other wall covering material thereon visually permitting the cover to blend with the associated wall. Removability of the cover is provided in part to comply with plumbing and building codes.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

An Embodiment of a Wall Drain Assembly

Referring to FIG. 1, the wall drain assembly 100 comprises the following primary components and subassemblies: (i) a drain body subassembly (a vertical installation panel 102, a drain body 104 and an plastic drain body opening insert 106 providing protection and also serving as an installation 106); (ii) drain extensions 108; (iii) an adjustment panel subassembly 110; and (iv) a positionable tile receiving cover 112. Additional and ancillary components include: (a) transition tape 114; (b) inside and outside corner covers 116 & 118; (c) furring strips 120; (d) reinforcing tape 122; (e) cover standoffs 124; (f) magnets 126; (g) no-hub coupling 128 and various stainless steel threaded fasteners.

Figure 2:
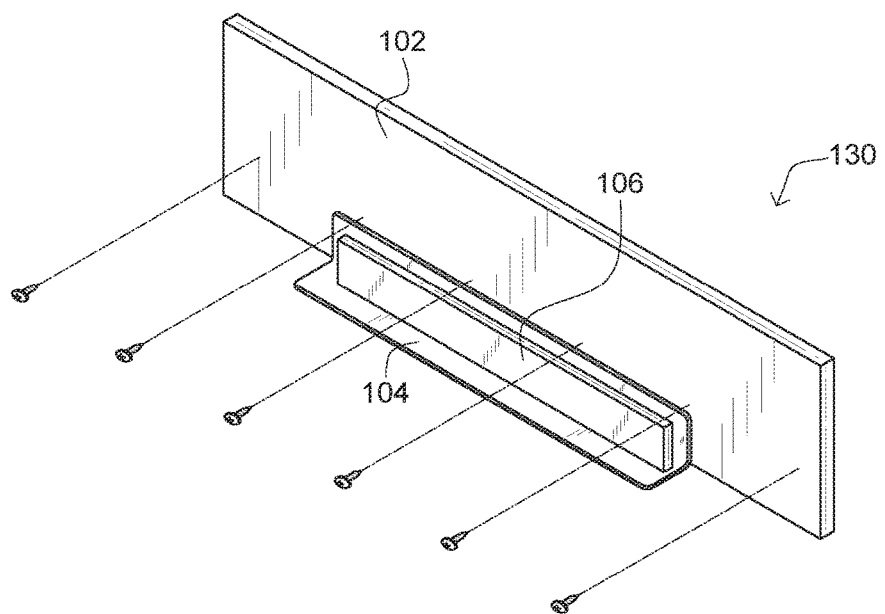
FIG. 2 is an isometric front view of the drain body subassembly according to one embodiment of the present invention.

The drain body subassembly 130 is best illustrated in FIG. 2 and comprises the drain body 104 mounted to the vertical installation panel 102 and the drain body opening insert 106, which seals the drain body opening during installation to prevent debris from falling into the drain and the associated waste removal pipe and serves as a gauge for adjustment panel installation.

The vertical installation panel 102 is typically fabricated from a water resistant material such as but not limited to plastic or a composite press board material. In at least one embodiment, the panel is fabricated from a lightweight honeycomb panel having fiberglass mat reinforced face sheets and a plastic honeycomb core. The use of a honeycomb panel over a solid material greatly reduces shipping weight of the entire assembly and facilitates greater ease in handling during installation. The panel's width defines the width of the wall drain assembly, i.e. a 48" drain assembly will have a 48" wide vertical installation panel. The panel is typically 1" thick and 12" in height and includes a centered cutout centered along the bottom edge to receive a portion of the drain body therein. Variations in the dimensions and composition of the panel are contemplated depending on particulars pertaining to the use and installation of the wall drain assembly. The panel is structural and can be easily cut through one face sheet or both as is necessary to fit any opening from 26"-48".

Figure 3A:
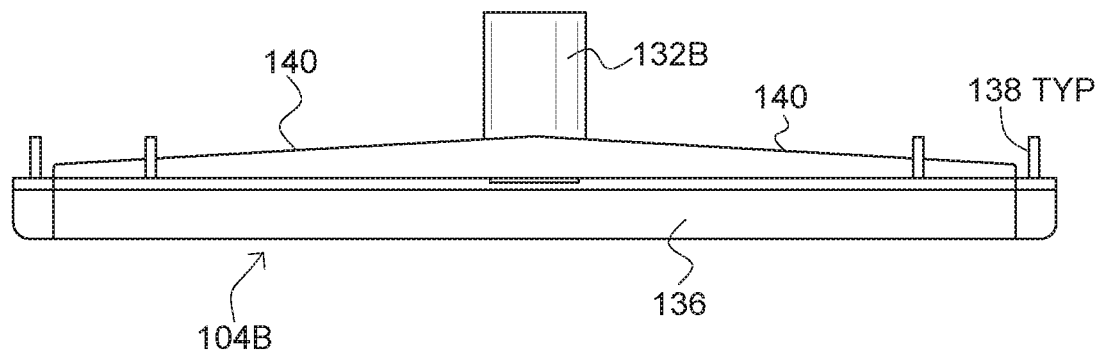
FIGS. 3A & 3B are isometric top views of respective horizontal and vertical discharge drain bodies according to one embodiment of the present invention.
Figure 3B:
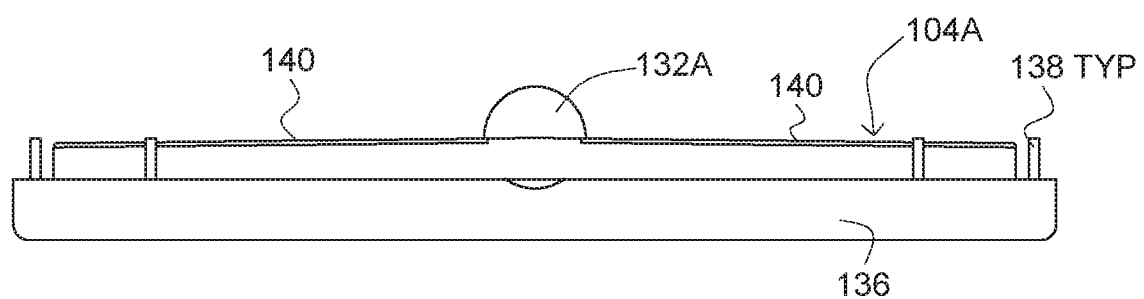

The drain body 104 is best illustrated in FIGS. 3A&B. It is typically fabricated from stainless steel but can also be fabricated from aluminum or a suitable reinforced or unreinforced plastic. Vertical and horizontal discharge varieties 104a&b respectively of the drain are typically available depending on the orientation of the drain pipe to which the drain connects. In one embodiment the drain is 26" long about 3" tall and about 2.5." deep not including the drain pipe connector 132*a*&*b*. The drain comprises left, right and top vertical flanges 134*a-c* and a horizontally extending bottom flange 136 that surround a rectangular 24" by 2" drain opening. The vertical flanges are received up against the front face of the vertical adjustment panel 102 and are utilized to attach the drain within the provided cutout to the panel with fasteners 138, adhesive or both. The bottom flange typically includes a pair of vertically downwardly extending spaced studs (not shown in FIGS. 3*a*&*b*) that are used to position the drain on the shower stall subfloor. The drain opening includes vertical back walls 140 that slope rearwardly from the left and right edges to the drain pipe connector. The sloped back walls help ensure that the flow of waste water is directed to the drain pipe.

The drain body opening insert 106, which is made of any suitable material but typically comprises plastic, is provided in part to prevent debris from falling into the drain body 104 and down the drain pipe during installation of the wall drain assembly as well as prevent run off liquid waterproofing from entering the opening. Typically, it snaps tightly into the opening and is intended to be removed and discarded after the shower floor is installed.

Figure 6:
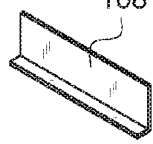
FIG. 6 is an isometric illustration of a drain extension piece according to one embodiment of the present invention.

A pair of drain extensions 108 are illustrated in FIG. 6. They each comprise L-shaped stainless plate designed to be installed over and on top off the front surface of the vertical installation panel 102 after waterproofing of the panel to the right and left of the drain body 104 with the short horizontal leg resting on the waterproofed shower pan floor. When installed the drain body and the left and right drain extensions span the entire width of the vertical installation panel at its base edge.

Figure 4:
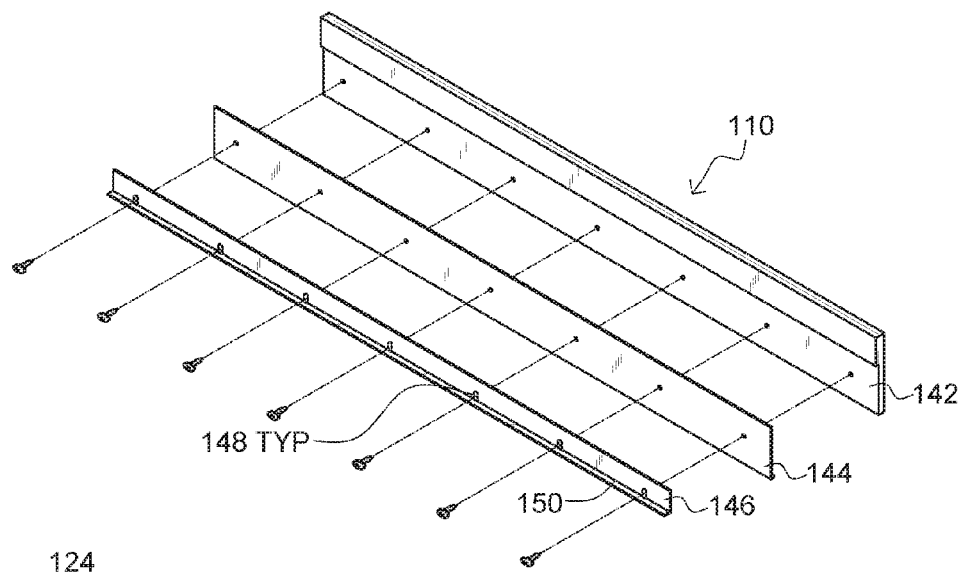
FIG. 4 is an exploded isometric front view of the adjustment panel subassembly according to one embodiment of the present invention.

The adjustment panel subassembly 110 is illustrated in FIG. 4 and comprises: (i) a base panel 142; (ii) a magnet cover 144; (iii) tile edging strip 146; and (iv) a plurality of magnets (not shown). The base panel is made of any suitable material that is either waterproof or water resistant. It is typically the same length as the vertical installation panel 102 with a height of about 6" and a thickness of about ½" (or similar to the thickness of a piece of sheet rock). Spaced cutouts are provided proximate the bottom edge of the panel in which magnets are received. The magnets are typically secured in place with an adhesive and hidden behind the magnet cover.

A stainless steel magnet cover 144 is provided over a lower portion of the front face of the base panel 142 and is typically recessed slightly into the base panel a distance approximately equivalent to the thickness of the positionable tile receiving cover. The magnet cover is secured to the base panel typically by way of an adhesive. A plurality of screw holes are provided through the magnet cover and through the underlying base panel for use in securing and positioning the tile edging strip 146 thereon as well as for securing the entire adjustment panel subassembly to the drain body subassembly 130 with a plurality of threaded fasteners.

The tile edging strip 146 is also fabricated from stainless steel and has an L-shape. Elongated slots 148 are distributed across the vertical leg of the strip and correspond with the locations of the screw holes on the magnet cover thereby permitting the strip to be adjusted upwardly and downwardly. The outwardly extending short horizontal leg 150 acts as a ledge against which a bottom row of wall tile can be positioned.

Figure 5:
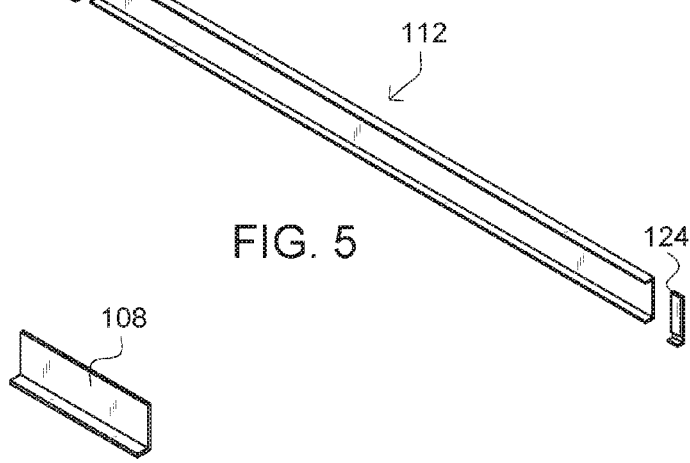
FIG. 5 is an isometric front view of the tile support cover in conjunction with an associated standoff pieces according to one embodiment of the present invention.

The positionable tile receiving cover 112 is illustrated in FIG. 5 and typically comprises a U-shaped stainless steel piece fashioned from plate having the same length as the adjustment panel subassembly 110 and a width (or height) of about 2.25". The cover is configured to receive tiles therein permitting it to blend in with the rest of the wall and cover all but the bottom ⅜" or so of the wall drain body opening. A pair of standoffs 124, also typically made of stainless steel are also provided to fit on the ends of the tile receiving cover and position it and hold it a predetermined distance (typically ⅜") above the shower floor.

Ancillary components including transition tape 114, the outside and inside corner covers 116 & 118; the furring strips 120, reinforcing tape 122 and various stainless steel fasteners are used in conjunction with the primary components to install the wall drain assembly and are described below as applicable.

A Method of Installing an Embodiment of the Wall Drain Assembly

Figure 11:
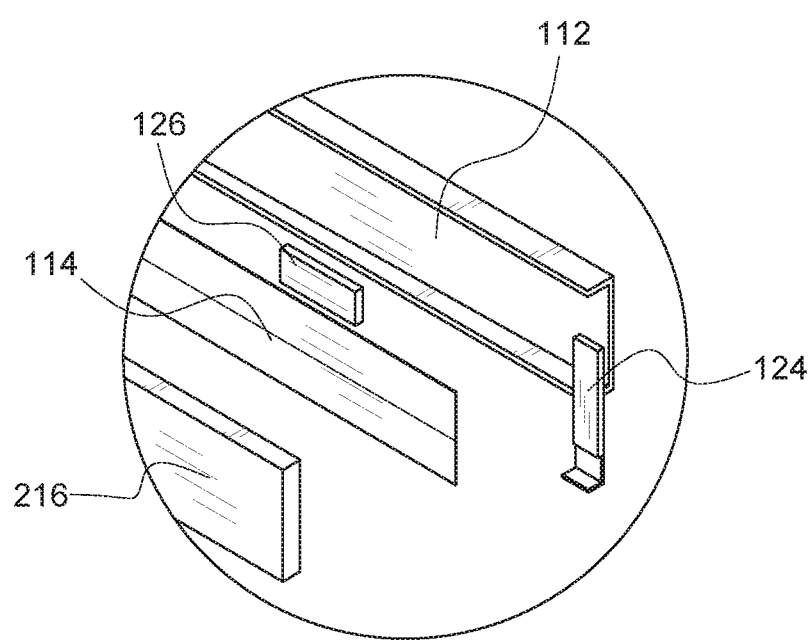
FIG. 11 is an exploded close up view of the portion of the installed wall drain of FIG. 7 appearing in circle C of FIG. 8 according to one embodiment of the present invention.
Figure 12:
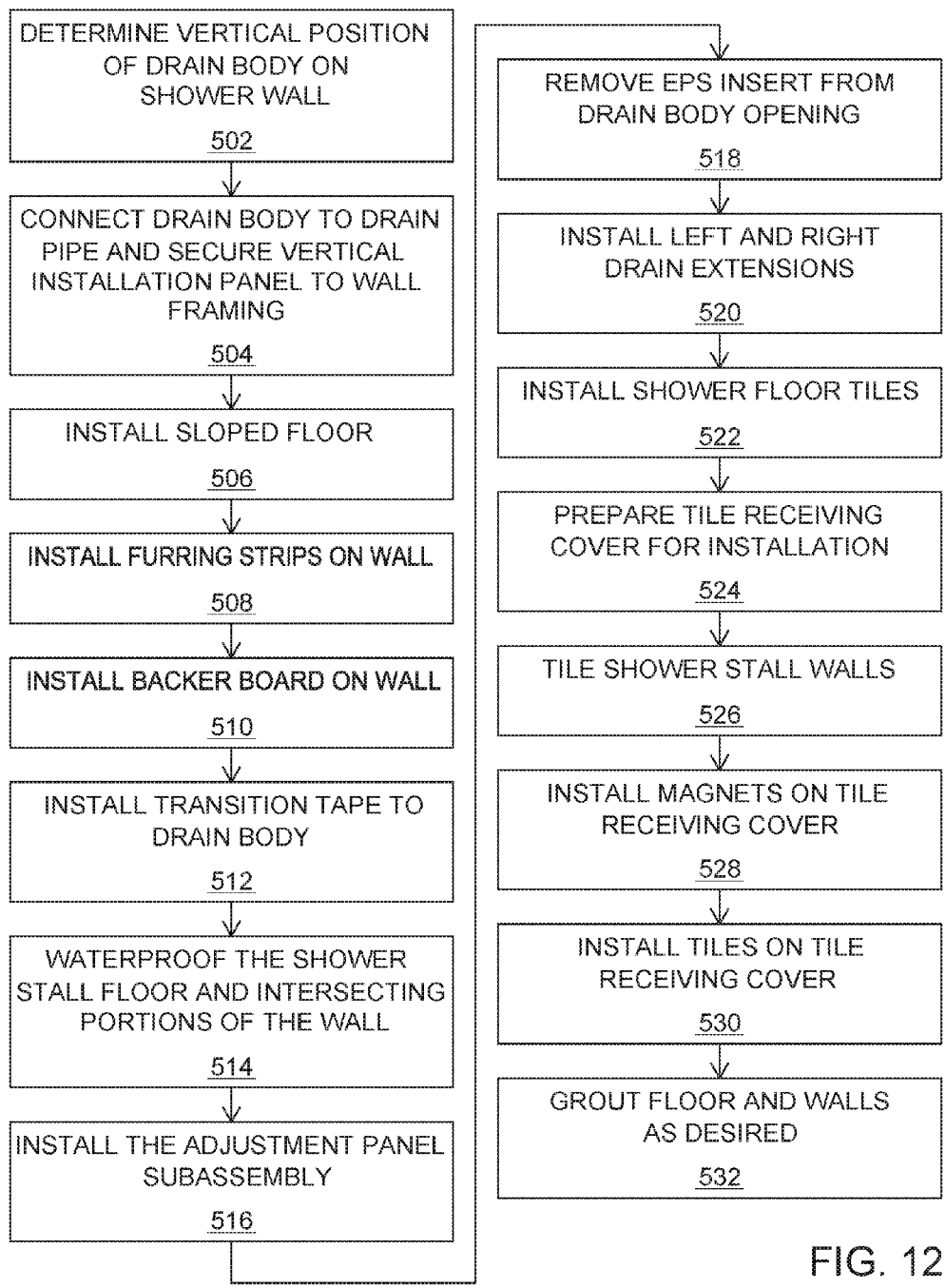
FIGS. 12 is a flow chart illustrating a process for installing a wall drain assembly according to one embodiment of the present invention.

With reference primarily to the flow chart 500 in FIGS. 12A-B one method of installing a wall drain assembly 100 is described. FIGS. 7-11 and FIGS. 13-20 provide illustration of the assembly as installed and in various states of installation in a shower wall 200. As can be appreciated by one of ordinary skill in the art of shower stall design and fabrication numerous installation variations are possible and contemplated based on the specific design characteristics of the stall.

As an initial step the installer determines and obtains the appropriate variation of the wall drain assembly 100 for a particular shower stall. The length of the assembly should be at least as long as the wall 200 on which it is to be installed. Embodiments of the drain can be offered in various sizes such as 48", 72" and 96" in length. In embodiments, the length typically pertains to the length of the vertical installation panel 102, the associated adjustment panel subassembly 110 and the tile receiving cover 112. The drain body 104 is often the same length and configuration regardless of the length of the assembly although in longer assemblies, such as 96", two drain bodies may be specified to handle the larger volume of water that may be associated with a larger shower stall. For walls having a length less than the length of the chosen wall assembly the various components are typically trimmed prior to installation to conform the assembly to the wall length. In addition to choosing the length of wall drain assembly, the orientation of the drain body's waste outlet is determined. Depending on the plumbing in the building in which the drain is to be installed a vertical discharge outlet may be preferred to a horizontal discharge outlet or vice versa.

As indicated in block 502 of FIG. 12A, the vertical position of the base of the drain body on the installation wall 200 is determined. The placement will depend on the manner in which the shower pan 202 is to be formed to slope towards the wall and consequently the drain body 104. The bottom horizontal flange 136 may be positioned above the subfloor 204 of the shower stall leaving room for a sloped pan to be formed there beneath such as with dry set concrete or preformed sloped structural board. In some variations, the subfloor constructed of any suitable materials may be presloped in which case horizontal flange is place against or just above the subfloor.

Figure 13:
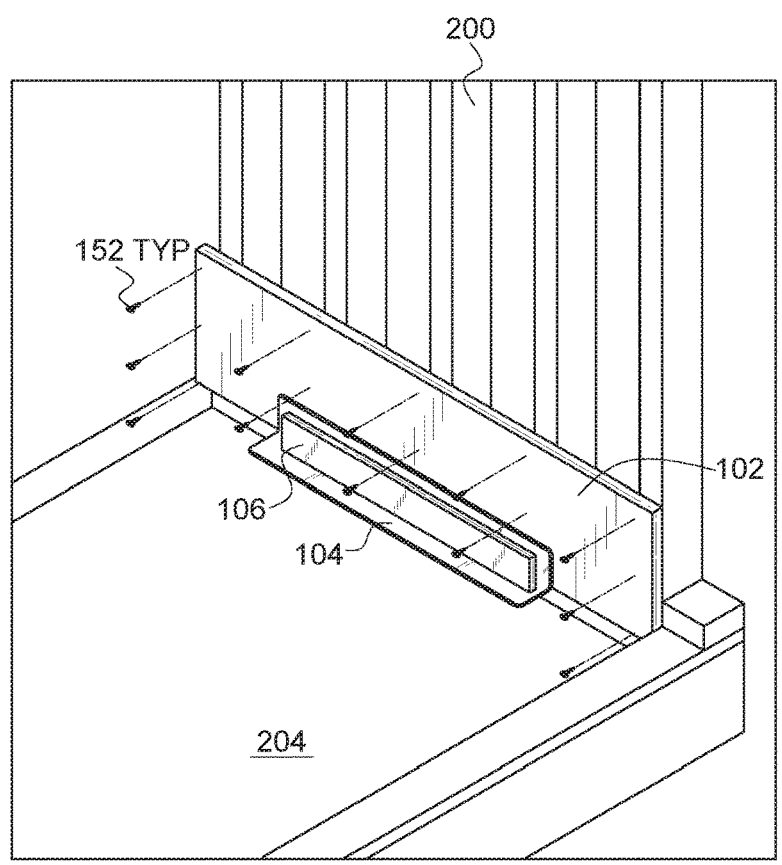
FIG. 13 illustrates the installation of the drain body subassembly to the shower stall wall according to one embodiment of the present invention.

With reference to block 504 and FIG. 13, using the no-hub coupling 128 provided as a component in some embodiments of the wall drain assembly 100 the drain body 104 is connected to the drain pipe 206 and the vertical installation panel 102 is secured to the wall framing 200 at the previously determined position typically using threaded fasteners 152. As can be appreciated, the drain body and its horizontal bottom flange 136 should be level regardless of the underlying subfloor 204.

As indicated in block 506 the slopped shower pan floor 202 is installed over the shower pan subfloor 204. The pan can be fabricated from any suitable means including dry set concrete or presloped panels. In general the pan slopes in a single direction downwardly toward the drain body 104.

Figure 14:
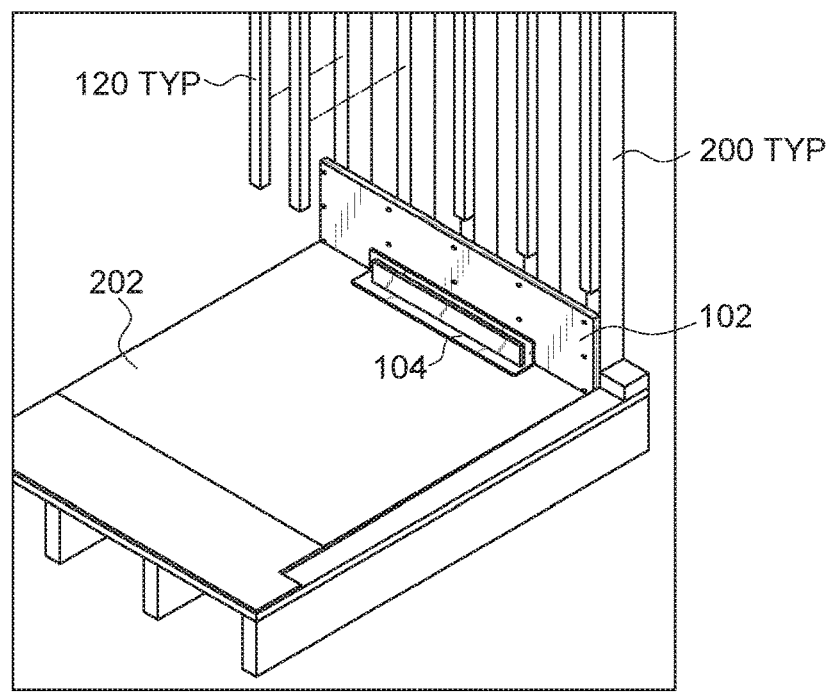
FIG. 14 illustrates the installation of the furring strips to the shower stall wall according to one embodiment of the present invention.

As indicated in block 508 and illustrated in FIG. 14, the furring strips 120 are installed against the framing studs 200 of the wall above the top edge of the vertical installation panel 102. The strips are of the same thickness of the vertical installation panel and are utilized to create a surface vertically contiguous with the front surface of the vertical installation panel on to which backer board can be secured. Referring to block 510, backboard 208 (see FIG. 15) is secured over the furring strips and the vertical installation panel. The bottom edge of the backer board is typically positioned a predetermined distance above the horizontal bottom flange 136 of the drain body 104. In one embodiment the predetermined distance is about 8.5".

Figure 15:
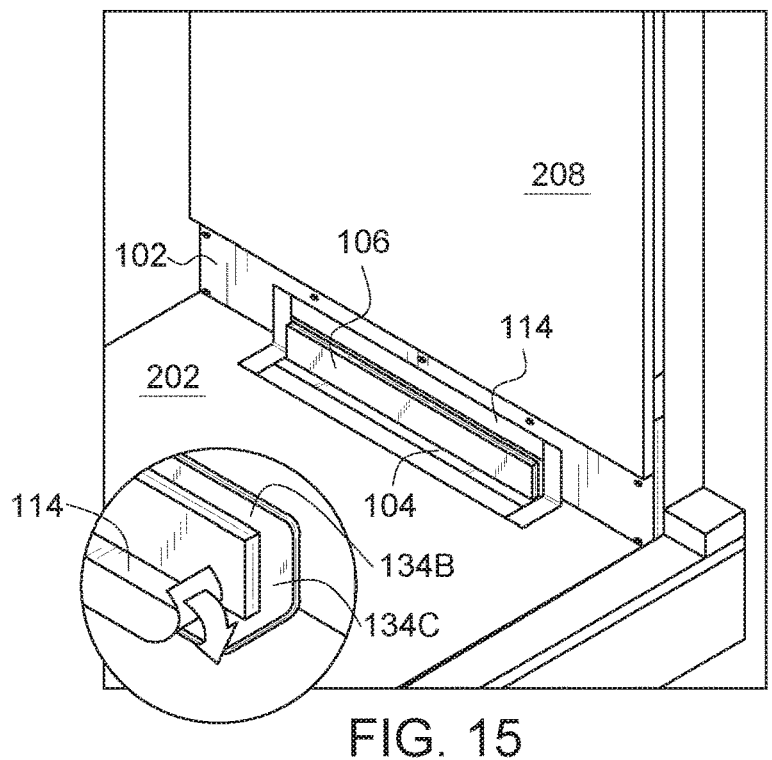
FIG. 15 illustrates the application of transition tape to the drain body flanges according to one embodiment of the present invention.

As indicated in block 512 and shown in FIG. 15, adhesive transition tape is secured over the edges of the flange surfaces on the drain body overlapping the exposed surfaces of the vertical and horizontal flanges 134 & 136 by 0.25-0.375" The transition tape comprises a waterproof membrane that is used here to bridge different surfaces and cover gaps. It has a roughened fleece-like exposed surface that is designed to bond with liquid waterproofing. Suitable transition tape includes any standard fleece backed butyl tape.

Referring to block 514 and FIGS. 16a-16d, the shower stall floor and its intersection with the stall walls are waterproofed. First as shown in FIG. 16 a liquid waterproofing sealant is applied to the area surrounding the intersection of the walls and the shower floor. Preferably the liquid waterproofing sealant is applied both at least 6" up each wall and at least 6" outwardly from the intersection on to the floor. The liquid waterproofing sealant is brushed over the vertical installation panel, the transition tape and the drain body overlapping the drain body opening insert. The liquid waterproofing sealant is also applied about 6" up the backer board located above the drain assembly.

Figure 16A:
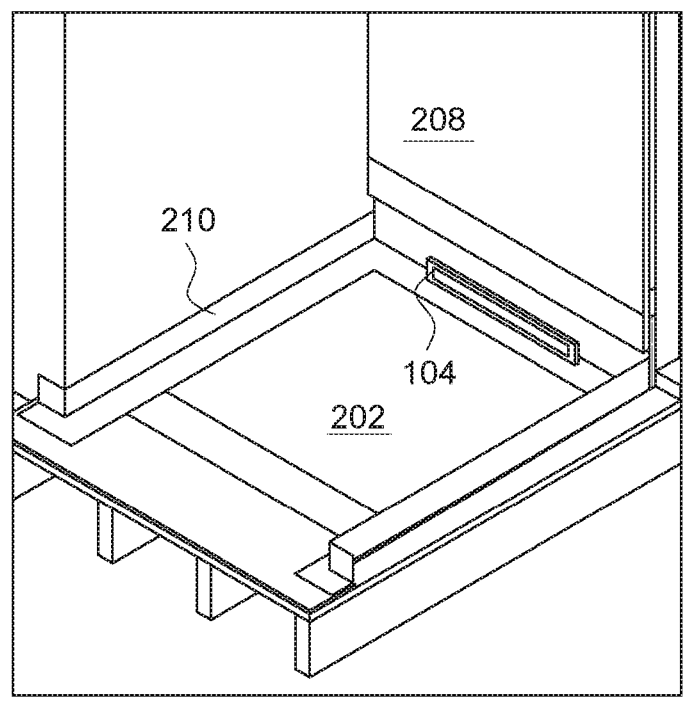
FIGS. 16*a-d* illustrate waterproofing ofthe shower stall floor according to one embodiment of the present invention.
Figure 16B:
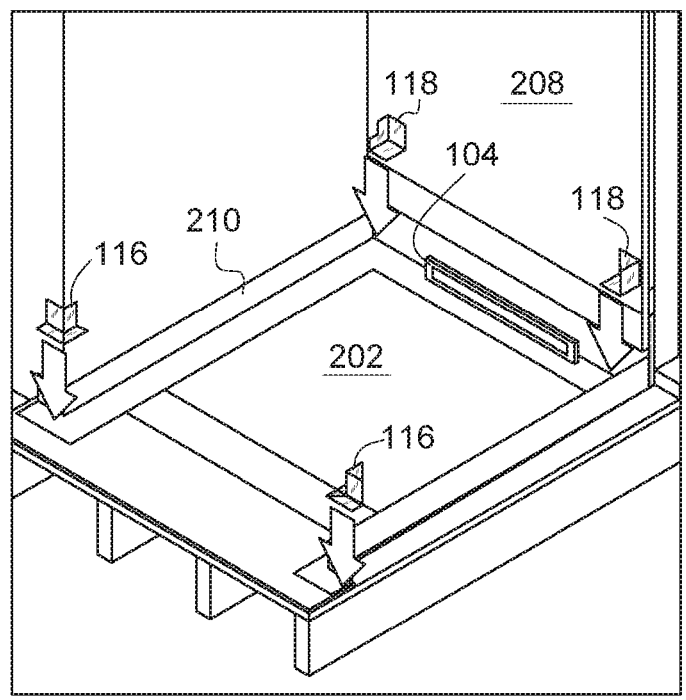
Figure 16C:
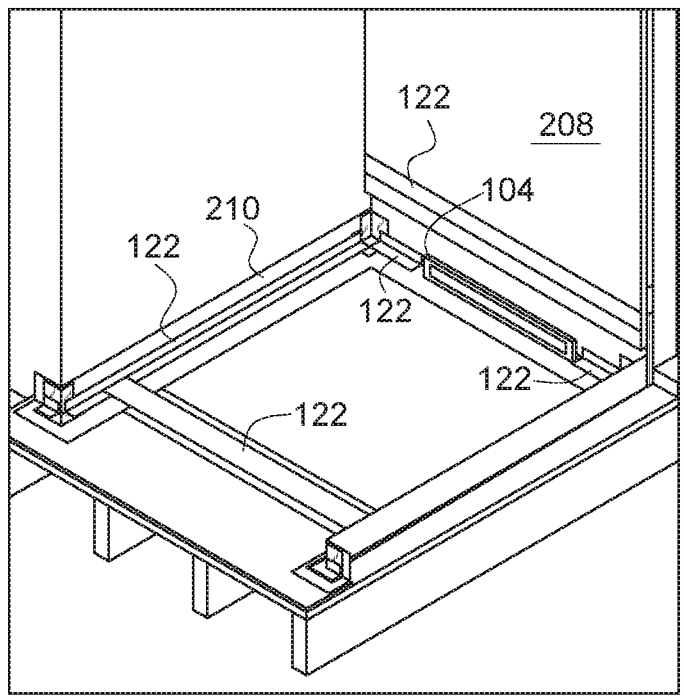

As shown in FIG. 16b, the permeable inside and outside corner covers 118 & 116 (as applicable) are pressed into the wet waterproofing sealant 210 and formed and compressed as necessary to conform them to the underlying shower stall structure. In FIG. 16c, permeable reinforcement tape is pressed, formed and compressed into the intersecting edges of the walls with the floor. Tape is also used to reinforce any seams or butts, such the joints between adjacent butted pre-sloped panels.

Figure 16D:
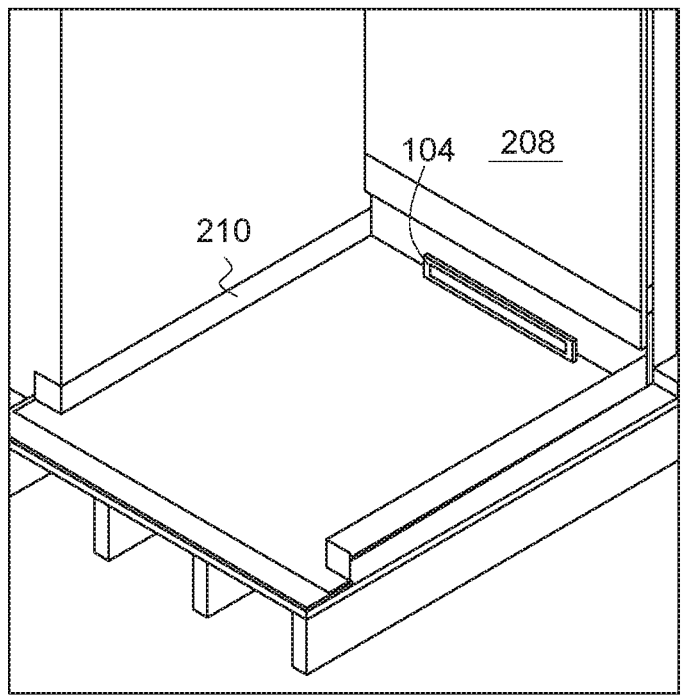

Referring to FIG. 16d, a first layer of liquid waterproofing sealant 210 is applied to the entire shower pan 202 and at least 6" up the corresponding shower walls as well as 6" above the top edge intersection of the vertical installation panel 202 with the bottom edge of the backer board 208. Once the first layer dries, a second layer of waterproofing sealant is typically applied. Additional layers can be applied but are typically not required.

Figure 17:
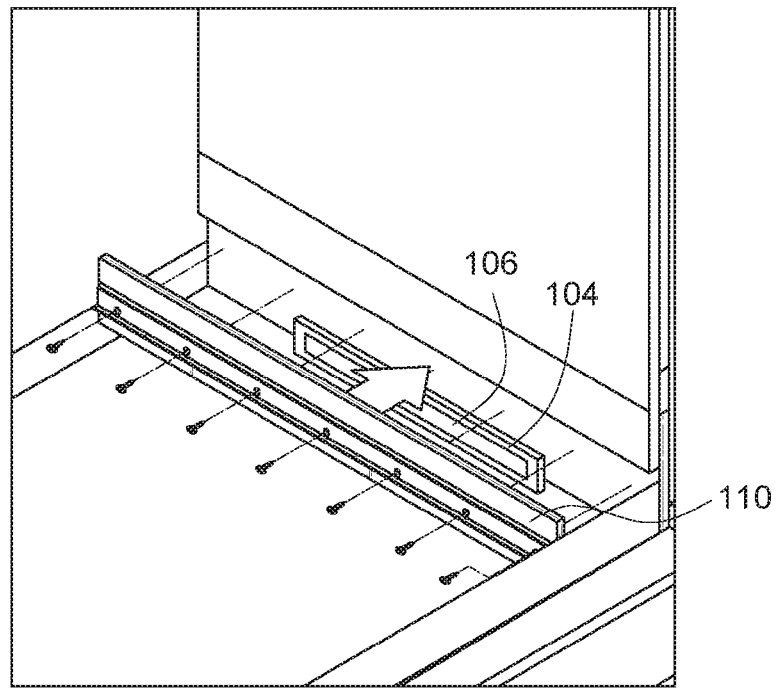
FIG. 17 illustrates the installation of the adjustment panel subassembly to the drain body subassembly according to one embodiment of the present invention.

As shown in FIG. 17 and indicated in block 516, the adjustment panel subassembly 110 is installed above the drain body 104. First, the bottom edge of the panel is placed against the top edge of the drain body opening insert 106. The adjustment panel is checked to ensure it is level and corrected as necessary. Finally, the adjustment panel assembly is secured in place using the provided stainless steel threaded fasteners. Of note, the fasteners are received through the elongated vertically orientated slots of the tile edging strip. As can be appreciated the slots permit subsequent adjustment of the strip as is necessary to provide clearance for the tile receiving cover 112.

Next as indicated in block 518, the drain body opening insert 106 is removed. Prior to removal the cured waterproofing material is cut along the perimeter of the insert.

Figure 18:
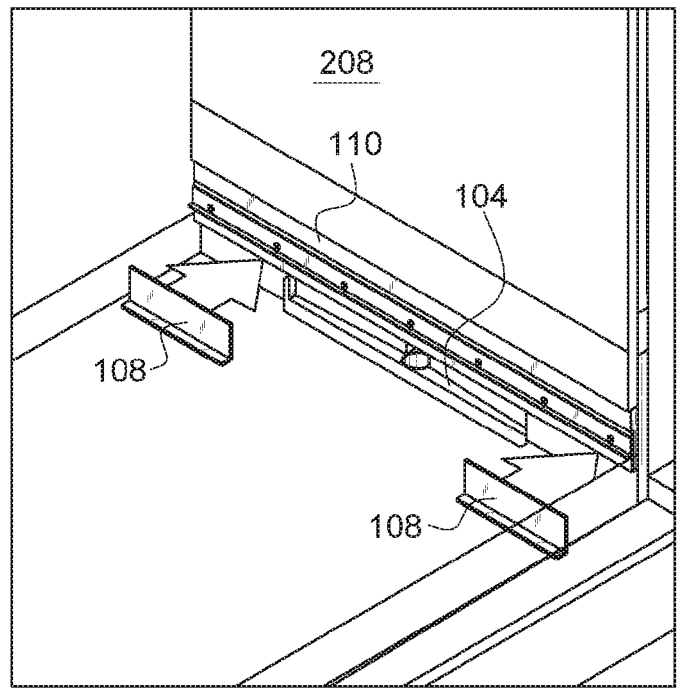
FIG. 18 illustrates the installation of the drain extensions to the wall drain assembly according to one embodiment of the present invention.

As indicated in block 520 and with reference to FIG. 18, the left and right drain extensions 108 are installed with thin set adhesive. First, the length of the wall on either side of the drain body is measured and the extensions are cut to the measured lengths. A strip of transition tape 114 is secured to the backside of each of the left and right extension. Thin set is applied over the tape, and the extensions are secured in place extending from the adjoining typically orthogonal wall to the corresponding edge of the drain trough. The outwardly portions of the extensions are installed flush with the face of the magnet cover 144. This facilitates the flow of waste water towards the drain body.

Figure 7:
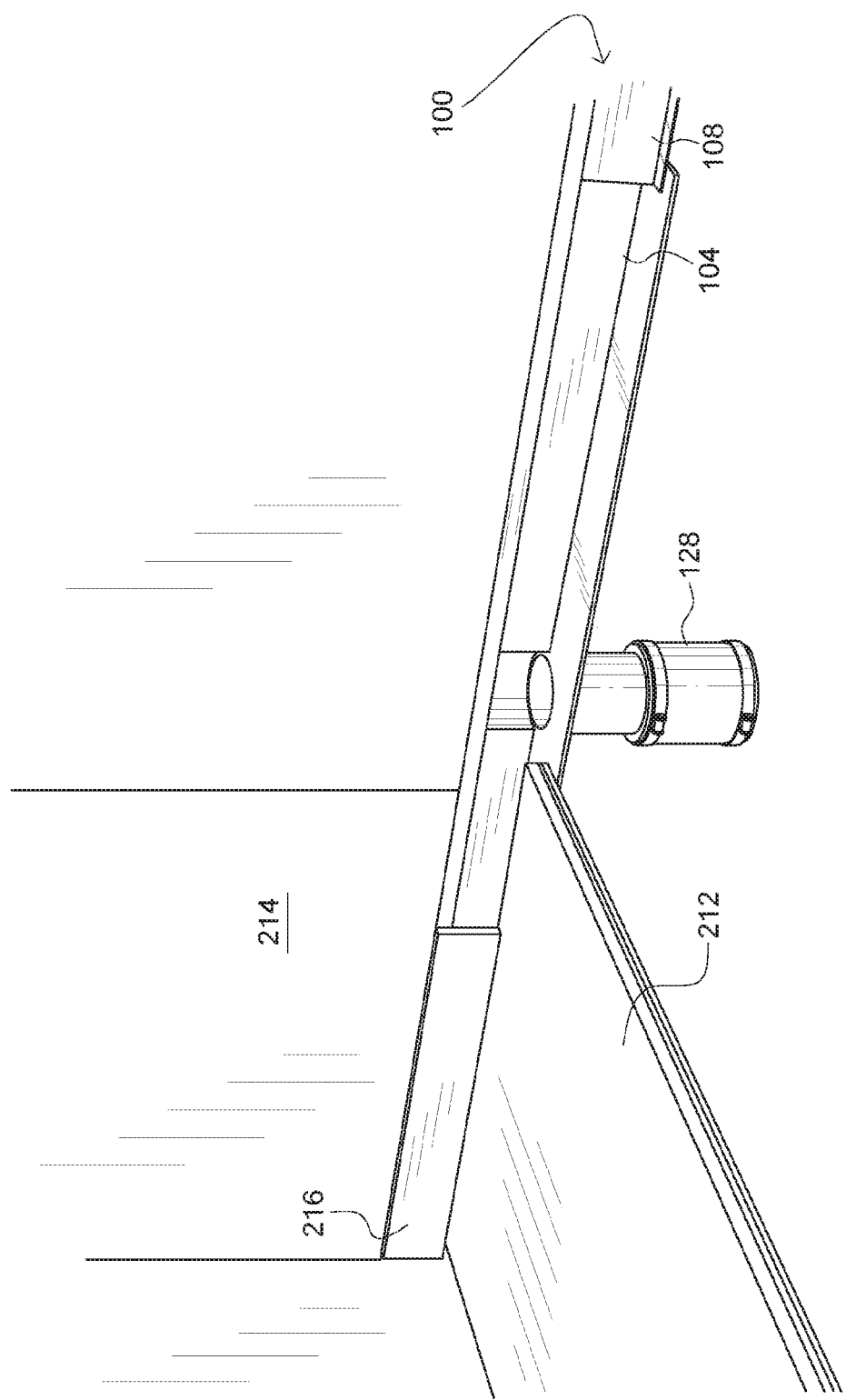
FIG. 7 is an isometric illustration partial mockup of an installed wall drain assembly according to one embodiment of the present invention.

Next as provided in block 522, the floor tiles 212 are installed over the shower pan 202 typically using a thin set adhesive. As can be seen in FIG. 7, the edge of the tiles proximate the drain body 104 overlap a portion of the horizontal bottom flange 136 thereof.

Referring to block 524, the tile receiving cover 112 is cut to length spanning the entire length of the wall in which the drain is installed. Standoffs 124 which include U-shaped receiving slots are slid over each end of the sized tile receiving cover. Legs extend from the c-shaped slotted portions and terminate in a horizontal feet. In use the standoffs set the gap between the shower floor and the cover bottom edge wherein waste water is permitted to flow underneath into the wall drain. Typically, the standoffs position the bottom edge of the cover about 0.25-0.375" above the shower floor.

Figure 19:
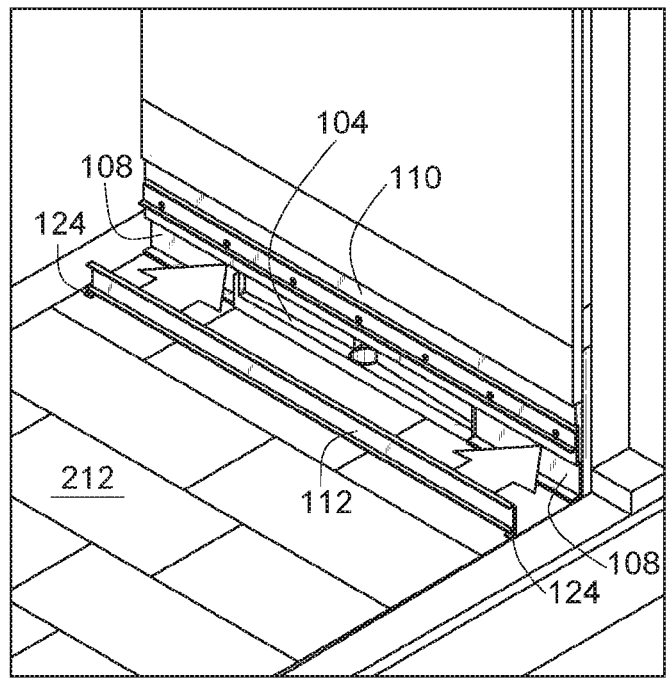
FIG. 19 illustrates the initial fitting of the tile receiving cover over the installed wall drain assembly according to one embodiment of the present invention.

As shown in FIG. 19 and indicated in block 524, the tile receiving cover 112 is slid into place covering the drain body 104 and the drain extensions 108. As may be necessary the fasteners securing the adjustment panel subassembly to the vertical installation panel are loosened slightly prior to fitting the cover to permit the tile edging strip to move upwardly and downwardly in the elongated slots 148. Once the cover is fitted in place, the tile edging strip 146 is adjusted such that its bottom edge 150 is resting on the top edge of the tile receiving cover and the fasteners can be retightened.

Figure 20:
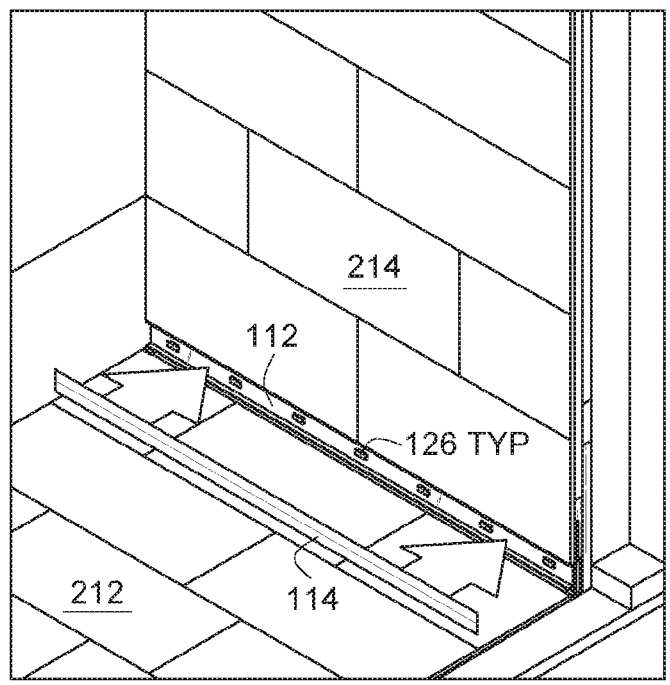
FIG. 20 illustrates the installation and securement to the tile receiving cover according to one embodiment of the present invention.

The tile receiving cover 112 is then removed and the walls are tiled with wall tiles 214 as indicated in block 526. Of note, the bottom edge of the bottom most row off tiles above the wall drain rest on the lip or horizontal leg 150 of the tile edging strip 146. As can be appreciated tiling the side walls will create a situation where a side wall tile overlaps the end of the drain adjacent to the sidewall. This circumstance may require the installer to shorten the tile receiving cover 112 so that it can be easily removed and replaced over the shower drain body 104 and associated extensions 108. Once the cover is finally sized and positioned in place, flat magnets 126 are placed on the front surface of the cover (see block 528). Because of the underlying magnets affixed to the adjustment panel subassembly, the cover magnets will align themselves. One or more strips of transition tape 114 is then applied over the magnets as shown in FIG. 20 to hold them firmly in place as well as provide an adhesive surface to which thin set will adhere. As indicated in block 530, the cover is typically removed from the drain and tiles 216 (see FIG. 7) are set and secured in the cover. As applicable as indicated in block 532, grout is applied to the shower walls, shower floor and the tiles in the tile receiving cover to complete the shower stall.

Figure 8:
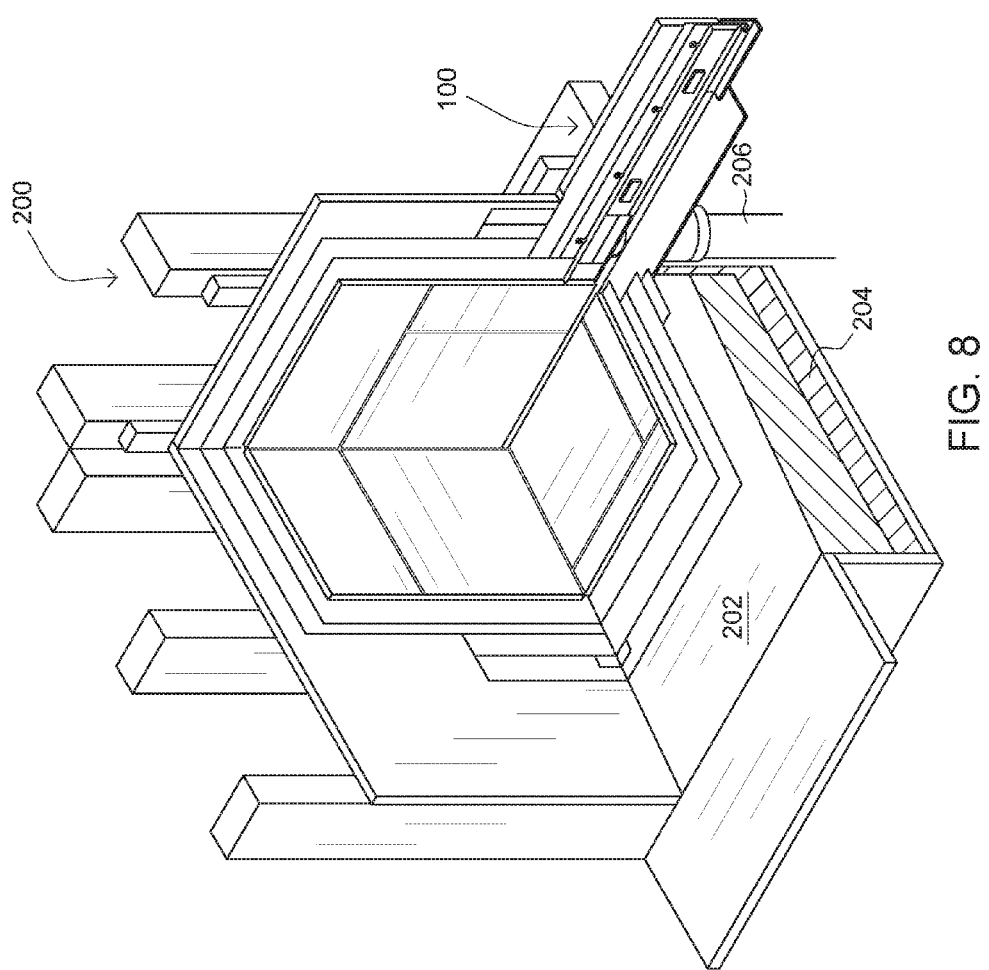
FIG. 8 is an isometric cutaway section of a shower stall illustrating an installed wall drain assembly according to one embodiment of the present invention.
Figure 9:
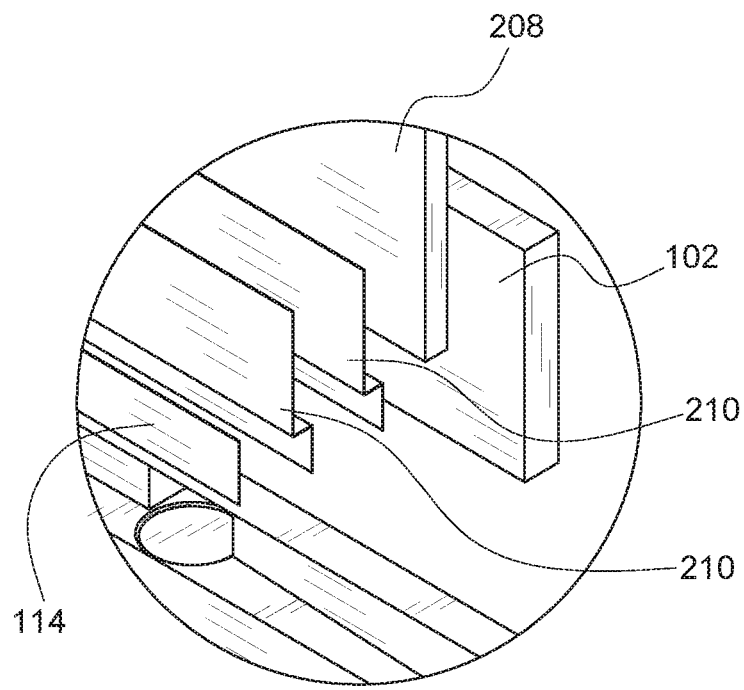
FIG. 9 is an exploded close up view of the portion of the installed wall drain of FIG. 7 appearing in circle A of FIG. 8 according to one embodiment of the present invention.
Figure 10:
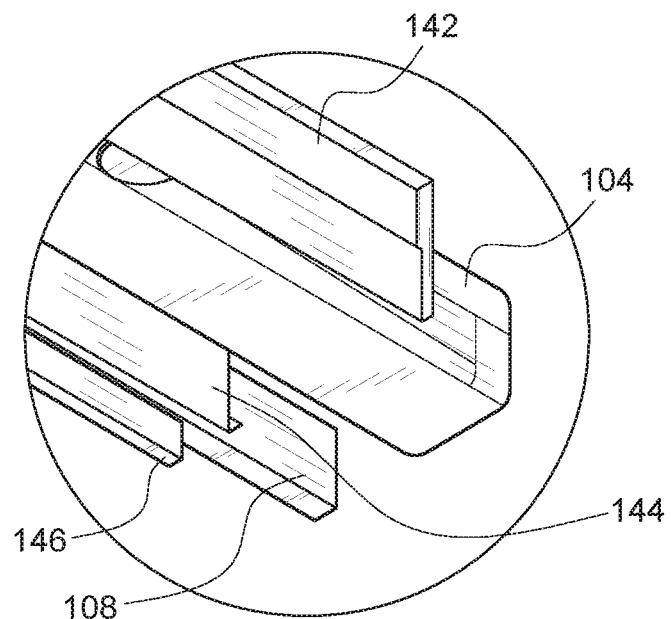
FIG. 10 is an exploded close up view of the portion of the installed wall drain of FIG. 7 appearing in circle B of FIG. 8 according to one embodiment of the present invention.

FIGS. 7&8 illustrate the wall shower drain assembly as installed in a shower stall with various portions of the assembly being cut away and/or portions of the shower stall floor and wall removed to clearly illustrate the installed configuration of the assembly. FIGS. 9-11 are partial exploded views illustrating the various components and elements of the wall drain assembly and the positioning thereof at various locations of the assembled drain as shown in FIG. 8.

Second and Third Embodiments of a Wall Drain Assembly

Figure 21:
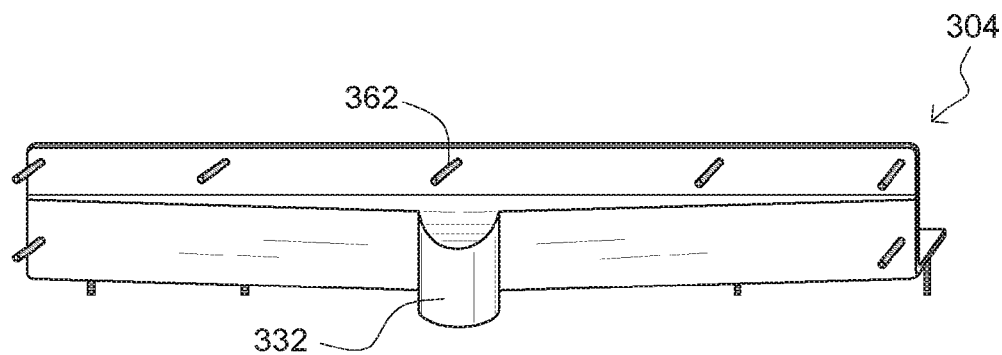
FIG. 21 is an isometric back view of a drain body according to a second embodiment of the present invention.
Figure 22:
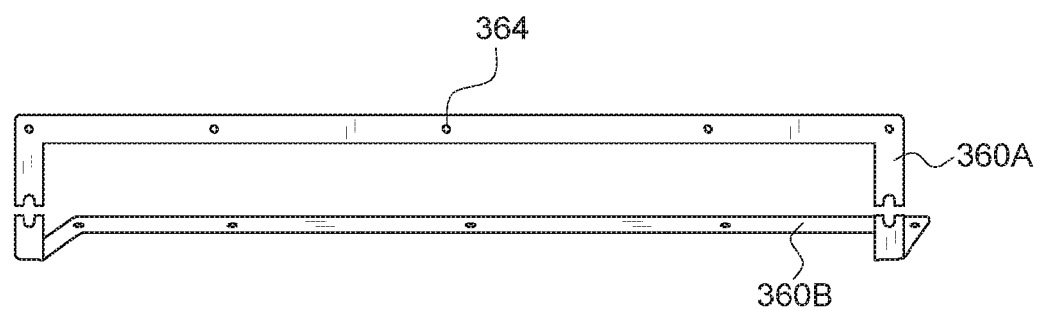
FIG. 22 is an isometric view of a two piece clamping collar used to sandwich a waterproof membrane between it and the second embodiment drain body according to the present invention.

FIG. 21 is an illustration of the backside of a second drain body 304 designed to be used with flexible sheet waterproofing in place of liquid waterproofing. FIG. 22 is an illustration of a two piece clamping collar 360a&b that is used in conjunction with the body. As shown, the body is made from stainless steel and like the first embodiment includes a drain opening (not shown), a drain pipe connector 332 and left, right top and bottom front flanges (not shown). The second embodiment drain body also includes a plurality of threaded studs 362 that surround extend from the back side of the drain opening. The collar is received there over and secured in place with suitable threaded nuts sandwiching the waterproof membrane therebetween.

Figure 23:
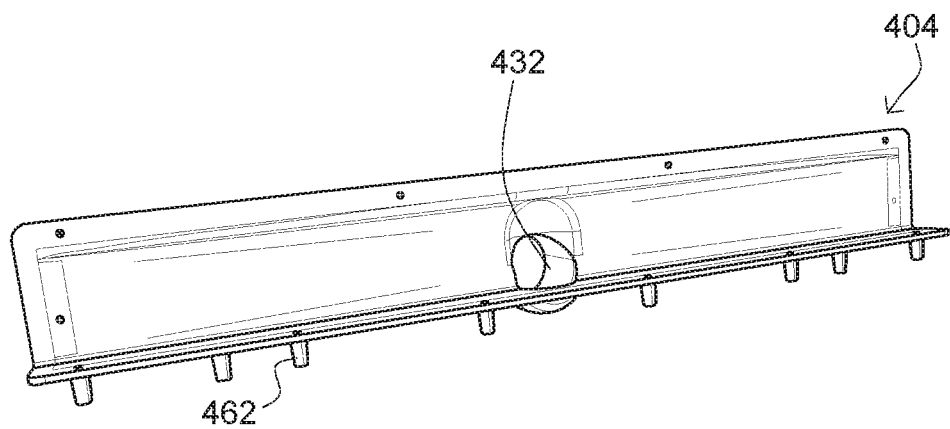
FIG. 23 is an isometric front view of a drain body according to a third embodiment of the present invention.
Figure 24:
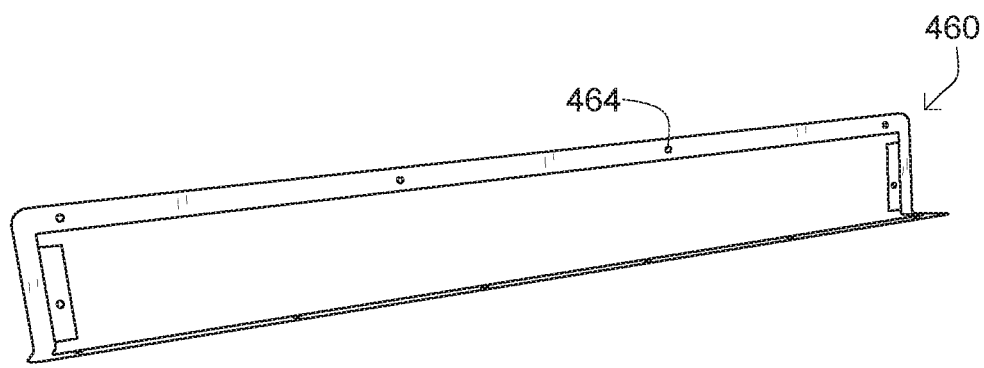
FIG. 24 is an isometric view of a one piece clamping collar used to sandwich a waterproof membrane between it and the third embodiment drain body according to the present invention.

FIG. 23 is an illustration of the front side of a third embodiment drain body 404 also designed to be used with flexible sheet waterproofing in place of liquid waterproofing. FIG. 24 is an illustration of a one piece clamping collar 460 that is used in conjunction with the body and is received over the front side to secure the waterproof sheeting in place. As shown, the body is made from PVC and like the first embodiment includes a drain opening, a drain pipe connector 432 and left, right top and bottom flanges. The second embodiment drain body also includes a plurality of bosses 462 that surround and are distributed around the drain opening. These bosses typically include threaded bores that extend inwardly from the front surfaces of the respective flanges and are configured to receive threaded fasteners through which the clamping collar is secured to the drain body sandwiching a sheet of waterproof membrane therebetween.

Except for respective drain body and its associated clamping collar most of the other components of the second and third embodiment assemblies are substantially similar to those described above and are utilized in substantially the same way.

Although the illustrated versions are made from stainless steel and PVC, versions made from other materials are contemplated as well. Further, variations having both horizontal and vertical drain pipe connectors exist.

The illustrated collars 360 & 460 are typically comprised of stainless steel although variations made of other suitable materials are contemplated. The clamp includes a plurality of holes that correspond to the bored bosses or threaded studs of the associated drain body. As shown both two piece and one piece collars are possible as are collars including even additional sections.

During installation of the other embodiment assemblies, the waterproof membrane is installed over the shower stall floor, partially up the sides of the shower walls and either (i) over the front of the drain body or (ii) against the backside of the drain body. The membrane is adhesively secured in place in the stall and is also secured in place around the drain body with the collar clamp. The drain extensions as necessary are installed to either side of the drain body on top of the waterproof membrane.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A drain assembly comprising:
a drain body having a left side, a right side, a top side, a bottom side, a front side and a drain outlet, the drain body (i) defining a elongated substantially vertically orientated drain opening on the front side, (ii) having a substantially horizontally orientated bottom flange on the bottom side, and (iii) an interior volume extending inwardly from the drain opening and having the drain outlet located therein, the drain body extending between the right and left sides a first length;
a left drain extension configured to extend from the left side and having a second length;
a right drain extension configured to extend from the right side and having a third length; and
a drain cover being configured to substantially cover the front side and the left and right drain extensions;
whereby the drain assembly is configured for installation within and along a wall of a shower stall.

2. The drain assembly of claim 1, wherein the drain outlet is generally vertically orientated.

3. The drain assembly of claim 1, wherein the drain opening is flanked by left, right and top flanges proximate the respective left, right and top sides, each of the left, right and top flanges being substantially vertically orientated.

4. The drain assembly of claim 1, wherein the interior volume includes generally vertically orientated left and right back sidewalls that are canted inwardly from a respective left or right edge towards the drain outlet.

5. The drain assembly of claim 1, wherein one or more studs extending downwardly from an bottom surface of the bottom flange.

6. The drain assembly of claim 1, wherein the left and right drain extensions are L-shaped.

7. The drain assembly of claim 1, wherein the drain cover is configured to receive tiles set therein.

8. The drain assembly of claim 1, wherein the drain cover includes a Ushaped elongated member.

9. The drain assembly of claim 1, further including left and right standoff legs, the standoff legs being received on the respective left and right ends of the drain cover whereby a bottom edge of the drain cover is raised above the floor of the shower when the drain assembly is installed.

10. The drain assembly of claim 1 further comprising a flat installation panel, the installation panel (a) being longer than the drain body and having an installation panel length, (b) having a panel thickness and panel top, bottom, left and right sides, and (c) including a cutout section at the panel bottom side wherein the drain body is secured to the installation panel at the cutout with the bottom side being substantially aligned with the panel bottom side.

11. The drain assembly of claim 10, wherein the installation panel is a sandwich panel having a lightweight core and front and back face sheets secured to the core.

12. The drain assembly of claim 10 further comprising a plurality of elongated furring strips, each furring strip having a thickness substantially similar to the panel thickness.

13. The drain assembly of claim 10 further comprising an adjustment panel subassembly, the adjustment subassembly including:
- a base panel, the base panel having a base panel length similar to the installation panel length;
- a tiling edge strip, the tiling edge strip having an edge strip length similar to the base panel length and including a horizontal leg extending outwardly from a edge strip bottom edge and a plurality of elongated slots distributed along the edge strip length wherein the base panel is secured;
- wherein (1) the base panel is secured to installation panel with a base panel bottom edge aligning with a drain opening top edge of the drain body, and (2) the tiling edge strip is secured to the base panel by a plurality of fasteners extending through the plurality of elongated slots.

14. The drain assembly of claim 13, furthering including first and second sets of one or more magnets each, the first set being secured to the base panel, the second set being secured to the drain cover, wherein The one or more magnets of the second set are positioned to be attracted to the one or more magnets of the first set thereby removably securing the drain cover in front of the drain opening.

15. The drain assembly of claim 1 wherein the drain cover is secured to the remainder of the drain assembly magnetically.

16. The drain assembly of claim 10 further including an adjustment panel subassembly, the adjustment panel subassembly comprising an adjustment panel comprising in part a magnetically receptive material and a height-adjustable tile edging piece, the tile edging piece including an outwardly extending lip adapted to receive and position wall tiles thereon.

17. A shower enclosure including at least a vertical first wall, a floor and a wall mounted drain assembly, the wall mounted drain assembly being at least partially mounted within the wall and including a vertically-orientated removable drain cover generally flush with the first wall.

18. The shower enclosure of claim 17 wherein the first wall is at least partially covered in one of ceramic, porcelain and stone tiles, and the drain cover includes one of corresponding ceramic, porcelain and stone tiles.

19. The shower enclosure of claim 17, wherein the wall mounted drain assembly extends substantially long an entire length of the first wall proximate an intersection with the floor.

20. The shower enclosure of claim 17, wherein the wall mounted drain assembly further includes a drain body defining a drain opening and having an outwardly extending horizontal bottom flange, the bottom flange resting on the floor, the flange being at least partial covered with a floor covering.

21. A drain assembly comprising:
- a drain body having a left side, a right side, a top side, a bottom side, a front side and a drain outlet, the drain body (i) defining a elongated substantially vertically orientated drain opening on the front side, (ii) having a substantially horizontally orientated bottom flange on the bottom side, and (iii) an interior volume extending inwardly from the drain opening and having the drain outlet located therein, the drain body extending between the right and left sides a first length; and
- a drain cover being configured to substantially cover the front side and left and right drain extensions;
- whereby the drain assembly is configured for installation within and along a wall of a shower stall.

22. The drain assembly of claim 21, wherein the left drain extension is configured to extend from the left side a second length, and the right drain extension is configured to extend from the right side the second length.

23. The drain assembly of claim 21, wherein the drain cover includes a U-shaped elongated member.

24. The drain assembly of claim 23, wherein the drain cover further includes tiles set into the elongated member.

25. The drain assembly of claim 21, wherein the drain cover further includes a magnetically receptive material.

26. The method of installing the wall drain assembly of claim 14 in a shower stall, the shower stall having at least a drain pipe, a subfloor and a first wall, the method comprising:
- locating position of drain body on the first wall;
- connecting drain outlet to the drain pipe;
- securing installation panel to framing of the first wall;
- installing a sloped floor on the subfloor;
- waterproofing the sloped floor and intersecting portions of the first wall;
- installing the adjustment panel subassembly against installation panel and above the drain opening;
- installing shower floor tiles to the subfloor;
- tiling the first wall; and
- installing the drain cover.

27. The method of claim 26, further comprising:
installing the adjustment panel assembly.

28. The method of claim 27, further comprising:
installing left and right drain extensions on left and right sides of the drain body.

29. The method of claim 27, further comprising:
cutting the drain cover to length; and
installing standoffs to ends of the drain cover.

30. The method of claim 29, further comprising:
installing magnets to the drain cover.

31. The method of claim 30, further comprising:
installing tiles on the drain cover.

* * * * *